United States Patent
Kolesnikov et al.

(10) Patent No.: US 6,217,759 B1
(45) Date of Patent: Apr. 17, 2001

(54) INSTALLATION FOR BIOCHEMICAL SEWAGE TREATMENT

(75) Inventors: Vladimir Petrovich Kolesnikov, ul. Eremenko, 54-110, 344068; Vladimir Dmitrievich Klimukhin; Vladimir Konstantinovich Gordeev-Gavrikov, all of Rostov-na-Donu (RU), a part interest (73) Assignees: Vladimir Petrovich Kolesnikov; Nadezhda Vladimirovna Kolesnikova; Vladimir Konstantinovich Gordeev-Gavrikov, all of Rostov-na-Donu (RU)

( * ) Notice: Subject to any disclaimer, the term of this patent is extended or adjusted under 35 U.S.C. 154(b) by 0 days.

(21) Appl. No.: 09/509,845
(22) PCT Filed: Apr. 27, 1998
(86) PCT No.: PCT/RU98/00126
§ 371 Date: Jun. 16, 2000
§ 102(e) Date: Jun. 16, 2000
(87) PCT Pub. No.: WO99/18038
PCT Pub. Date: Apr. 15, 1999

(30) Foreign Application Priority Data

Oct. 3, 1997 (RU) .................................... 97116465

(51) Int. Cl.$^7$ .............................. C02F 3/06; C02F 3/02; C02F 3/10; C02F 3/24
(52) U.S. Cl. ............ 210/194; 210/195.3; 210/197; 210/151; 210/201; 210/202; 210/205; 210/198.1; 210/748; 210/603; 210/610; 210/615
(58) Field of Search .................... 210/194, 195.3, 210/197, 198.1, 151, 221.2, 202, 748, 615, 624, 625, 626, 610, 603, 201, 205

(56) References Cited

U.S. PATENT DOCUMENTS 5,078,882 * 1/1992 Northrop .
5,447,633 * 9/1995 Matsche et al. .

FOREIGN PATENT DOCUMENTS

| 2165831 | * | 4/1986 | (GB) . |
| 57-043048 | * | 9/1982 | (JP) . |
| 1020379 | | 3/1981 | (RU) . |
| 1020379 | * | 5/1983 | (SU) . |
| 97/05070 | * | 2/1997 | (WO) . |

OTHER PUBLICATIONS

"The Dependence of the He–Ne Laser Radioprotective Effect Produced upon the Bacteria Cells on the Interval between the Two Kinds of Radiation", Voskonyan K.Sh., Simonyan N.V. et al, Radibiologiya—1987, v. 27, No. 5, pp. 708–711.

S.V. Yakovlev, Ya.A. Karelin et al. Canalisation—Moscow, Stroyizdat. 1976, pp. 260–262.

* cited by examiner

Primary Examiner—Thomas M. Lithgow
(74) Attorney, Agent, or Firm—Collard & Roe, P.C.

(57) ABSTRACT

The invention is designed for the treatment of household and industrial sewage, mainly for the biochemical treatment of high-contaminated sewage produced by those enterprises referred to the food, chemical, pharmaceutical and microbiological industries. The installation contains a primary purification stage biocoagulator (3), a secondary stage biocoagulator (14) whose sediment is introduced into a fermenter (17). Clarified effluent from biocoagulator (14) and fermenter (17) is further introduced into a pump plant (33), whereby effluent is pumped into a biofilter (39) and further into a combined device (44) of the same design as fermenter (17)—irrigation system, artificial charge, aeration columns, settling section. Clarified effluent from combined device (44) is finally processed into a tertiary purification bioreactor (50). To prevent contamination of the people with pathogenic germs, all the spaces above the aerated elements of the installation are hermetically sealed, and have air ducts (50) connected to them.

7 Claims, 7 Drawing Sheets

INSTALLATION FOR BIOCHEMICAL SEWAGE TREATMENT

TECHNOLOGICAL SPHERE

The invention belongs to the treatment of industrial sewage, more precisely to the installation for biochemical treatment of high-concentrated sewage with the organic impurity concentration of up to 10000 mg/l $BOD_{20}$ and suspended matters up to 5000 mg/l; it can be applied for the purification of the sewage produced by sugar-houses, yeast factories, meat-preserving and fish factories, those enterprises referred to chemical and pharmaceutical industries.

Besides, this invention may also be used for public services and technological microbiology.

PREVIOUS LEVEL OF TECHNOLOGY

For the treatment of the sewage showing high content of organic impurities, traditionally applied are step-like purification schemes which include primary settlers, biofilters with plastic charge in them, aeration tanks and secondary settlers. At the first stage, the biofilters, alongside with the settling, also provide BOD (biochemical oxygen demand) reduction by 50–70%. The second stage is performed in aerotanks working in the mode of average or low loads upon sludge and provides the purification effect (after settling) of up to 95–98%. In case there are fats and emulsified matters in the sewage, the technological purification scheme is complemented by flotation units.

The drawback of the above schemes is their operational complexity due to the application of various pumps and compressors in the technological processes. To run off the foam, scraper-type devices are installed in the flotation units. Besides, in order to provide environmentally clean operation of the plant, it is necessary to install fans sucking off and feeding to the decontaminating installations, the air used for biochemical processes. The availability of different types of machinery and low oxygen utilisation factor in aeration tanks stipulate high energy consumption during sewage purification.

Well known is a combined device for biochemical sewage treatment, the one containing a biofilter located above the settler aerotank with the pipes providing jet aeration of the liquid and attached to a collecting tray of the biofilter, a mixing chamber and a circulating pump (RU No. 1020379 CO02F3/02, 1981). The operation principle of the device is as follows: the sewage, after being preliminarily treated (i.e. after the removal of rough dispersive impurities), is driven to the mixing chamber where the sludge mixture from the settler aerotank is also directed under hydrostatic pressure. Further on, the mixture of sewage and sludge is circulating with the help of the pump through the biofilter, feeding pipes and settler aerotank. Biochemical oxidation of the impurities is performed due to the biocenosis attached to the biofilter charge, as well as by microorganisms of the active sludge contained within the settler aerotank. While being irrigated and driven through the biofilter, the sludge mixture is saturated with air oxygen. Additional saturation of the liquid with oxygen inside the aeration tank and the stirring of its contents are performed due to the process of air involvement in the feeding pipes, movement of gas-and-liquid flows and during the air bubble upward floating. The merits of the above device are as follows: high sewage purification level due to the combination of oxidation and sorption potentials of the biofilter biocenosis and the aerotank active sludge; application of a simple low-pressure pump as the major equipment unit; low power consumption reaching 0.5 kWt h/kg BOD.

On the other hand, the application of the above device for concentrated sewage treatment in a one-step design is restricted by the purification effect, i.e. the purification level, in what concerns the residual impurities BOD and the suspended matters of up to 15 mg/l, may be achieved only in case of the organic impurity contents in the initial water of up to 1000 mg/l and the suspended matters of up to 500 mg/l BOD.

Besides that, to provide oxidation of the sewage nitrogen compounds it is necessary to significantly enlarge the size of the combined device and the deep sewage tertiary treatment installation, e.g. of a bioreactor with artificial charge in it.

Known is the biostimulating effect of a He—Ne laser (HNL) upon the activation of bioenergetic processes in microbe cells (Voskonyan K. Sh., Simonyan N. V. et. al. The Dependence of the He—Ne Laser Radioprotective Effect Produced upon the Bacteria Cells on the interval between the Two Kinds of Radiation. Radibiologiya - 1987, v.27, No.5, pp. 708–711). Experiments have been undertaken on the effect of 633 nm long wave HNL upon the biological activity of the active microflora of sludge. The total amount of bacteria raised 3–3.5 times after 1 hour in case of 15 second to 5 minute long radiation. Meanwhile the $NO_3$ concentration grew 2.5 times, and the $NH_4^+$ grew 2 times.

The cone-like shape of the settler aerotank inside a prototype casing would have been expedient provided the capacity range of the plant reached 1000 $m^3$/day. In the event of higher capacity, due to their angles making 50°, the construction height of the settler aerotanks is significantly increased, while in case the bottom is designed to have a number of cone pits in it, and the sludge is driven out of each of those pits, the adjustment of the hydrodynamic mode of the sludge mixture circulation is complexified.

The other factor limiting the application of the device, is the unavailability of charge materials which would meet the following requirements to the device operation:

the developed biocenosis should be fixed on the charge surface, this biocenosis, alongside sorption and oxidation of the organic impurities, performing nitrification and denitrification;

the charge should not be silted during the irrigation with the sewage whose sludge solid matter concentration reaches 7 g/l.

The efficiency of the biofilter charge operation depends on the regularity of irrigation of its surface. On the other hand, the existing sprinkler systems fail to provide satisfactory regularity of irrigation under constant pressure inside the distribution line since the liquid drops are mainly fed within the radial range of 0.2–0.3 m.

Known is the application, within the technological designs with aeration installation, of biocoagulators destined to partially extract sewage impurities (see the book: S. V. Yakovlev, Ya. A. Karelin et. al. Canalisation.—Moscow. Stroyizdat. 1976. Pp. 260–262).

It seems expedient, in case the sewage impurities show concentration higher than 2000 mg/l BOD, to reduce, with the help of the second biocoagulation stage, the impurities content to 80% and oxidise the caught matters in a fermenter whose design is analogous to that of the combined device. The process of destruction of the impurities in the above unit may be performed with high loads upon the active biomass. The processes of the impurities oxidation should be activated by way of radiation of the sludge mixture with He—Ne lasers. To oxidise the rest of the impurities, one should apply a biofilter with a sunk and unsunk charge, a combined device and deep tertiary treatment of sewage.

With the aim of destruction of the sewage nitrogen compounds, the process is performed with average and low loads upon the active biomass and with the laser biostimulation application. In order to efficiently mix the sewage and sludge, to supply the biochemical processes with oxygen and displace utilised air for its further disinfection, it seems expedient to apply water jet aerators within biocoagulators, biofilter and bioreactor for tertiary sewage treatment.

In order to reduce the plant height, the fermentor and combined device bottom may be flat, while to efficiently stir the sludge mixture, it would be reasonable to use definite location of the aeration system feeding pipes and apply devices preventing sludge bedding.

The oxidising power of the plant can be enhanced due to the new configurations of the charge materials. At the same time, the biofilter charge should favour the fixing of the developed biocenosis to the surface and, simultaneously, exclude sludge bedding, while the sunk charge of the fermentor, biofilter and combined device should have highly active surface and permit the liquid to freely move through itself. At the same time, the design of the sunk charge within the tertiary purification bioreactor should also prevent the removal of the floating matters. High mass transferring properties of such charges will permit to significantly raise the purifying effect and, correspondingly, reduce the size of the plant.

To raise the regularity of irrigation of the biofilter charge within the fermentor, separate biofilter and combined device, it is desirable to use an irrigation system based on shocking and crushing separate liquid jets as they fall upon a hard surface.

The basis for the invention is the problem of designing a high concentrated sewage biochemical treatment installation whose constructive embodiment would allow to raise the purification level and increase the reliability of the technological operation mode, at the same time reducing the capital outlays and the purification operation costs.

The above problem has been solved by the installation for the biochemical purification of high concentrated sewage. The above installation includes biocoagulator of the first purification stage comprising a flotation chamber equipped with fine air deflocculation aerators, a water jet aerator, its inlet chamber, foam reflector and collecting trays with pipes removing foam and clarified flows; additionally included are: a biocoagulator of the second purification stage with a water jet aerator, its inlet chamber and pipes removing clarified flows and sediment, a fermentor with an irrigating system equipped with He—Ne lasers (HNL), a biofilter, aeration columns, settler aerotank with artificial charge, a circulating pump and a clarified flow removing pipeline; a pumping plant with an inlet reservoir and two pumps transferring clarified flows; a separate biofilter provided with an intermediate vessel, HNL irrigating system, charge, collecting trays, aeration columns, reaction vessel with sunk charge and a pipeline removing the sludge mixture to the mixing chamber of the combined device also equipped with HNL; tertiary sewage treatment bioreactor provided with a water jet aerator, an aeration chamber, a chamber with artificial charge, perforated pipelines and a circulating pump, all the above units being interconnected with feeding pipes. The primary sewage pipeline is connected to the inlet chamber of the water jet aerator of the first stage purification biocoagulator flotator whose pipeline removing the clarified flows is attached to the inlet chamber of the water jet aerator of the second stage purification biocoagulator, the pipeline removing the sediment from the biocoagulator is connected to the sucking pipeline of the fermentor circulating pump, while the pressure pipeline of the above pump is attached to the fermentor irrigating system and the inlet chambers of the first and second purification stage water aerators. The pipeline removing partially purified water from the fermentor and the pipeline removing clarified flows from the biocoagulator, are connected to the inlet reservoir of the pumping plant, the pressure pipeline of the first pump transferring clarified flows being attached to the inlet chamber of the first purification stage water jet aerator, and the pressure pipeline of the second pump being combined with the intermediary vessel of the biofilter, to which also attached is the pressure pipeline of the circulating pump of the combined device, the pressure pipeline being in its turn attached to the inlet chambers of the first and second stage purification water jet aerators and to the biofilter irrigating system of the combined device, and the pipeline removing clarified water from the above-mentioned device is attached to the aeration chamber of the tertiary sewage purification bioreactor.

With the aim of preventing personnel's contamination with pathogenic germs, all the aerated elements of the invented installation are hermetically sealed and have air removing ducts attached to them which are in their turn attached to a bactericidal installation. In accordance with the invention, the aeration columns in the fermentor and combined device are designed as diverging beams of pipes whose lower ends are evenly placed over the flat section of the aerotank bottom in a 0.1–0.7 m distance above it; a sludge mixture removing pipeline with sucking branches is located along the bottom perimeter; the bottom has rollers on it placed at an angle of 45–60 degrees and, above them, there are plastic sheets with bristles and holes.

The invention supposes to install the charge in the sewage tertiary purification bioreactor, this charge also being plastic sheets with bristles and holes, but this time the intervals between the bristles and diameters of the holes reducing gradually upward. The charge elements of the biofilters are made as corrugated sheets with horizontal stripes of the roughness factor $n=0.017$–$0.015$ in their upper section, $n=0.014$–$0.012$ in the middle section, $n=0.011$–$0.010$ in the lower section. There also are vertical elements: protruding smooth stripes and slots running from the middle to the lower section of the sheets.

In accordance with the invention, the irrigation systems are manufactured from distributing chutes with the adjusting gears and drain branch pipes, their length being equal to 4–10 diameters, located at a 1–1.5 m distance from the upper cuts of the branch pipes to the reflectors, these branch pipes being mounted so that the distance between them and the chute bottom may be altered.

Thus, the above-mentioned structural concepts permit to provide a high and steady effect of high concentrated sewage purification with a significant reduction of the price for such an operation.

The essence of the invention is as follows. The installation inside the biocoagulator flotator of the water jet aerator with an inlet chamber and foam reflector provides efficient stirring of sewage and sludge first in the flotation chamber. Those air bubbles floating upwards from the aerator enhance the flotation effect created by the fine air deflocculation and form waves on the liquid surface. The wave-like movement of liquid combined with the directing movement of the reflector, drive the foam to the collecting chutes. The application, at the purification initial stage, of sorption properties of the excessive sludge removed from the installation permits to raise the effect of catching organic impurities (up to 30%) and suspended matters (up to 60%). The application of the impurities biocoagulating process with the help of the active sludge at the purification second stage allows to additionally reduce the contents of organic matters in sewage by 30–50%, and suspended matters by 10–20%. The proposed solution will also permit to simplify the impurities removal and the adjustment of organic loads upon the active biomass inside the fermentor. Flexible adjustment will in its turn provide the maintenance of the high speed of biochemical oxidation. Moreover, the functions of catching the organic substrate, the impurities oxidation and the excessive biomass removal are all performed by a single pump.

To raise the growing speed of germs inside the fermentor, He—Ne radiation of sludge mixture is applied. This enables to maintain high speed of the organic impurities sorption and metabolism in the periods of abrupt raise of the organic and hydraulic loads upon the installation.

The most economic way of destruction of the rest part of organic and nitrogen containing impurities is sequential impurities oxidation inside the biofilter, aeration plant and tertiary purification bioreactor with artificial load. Application of a combined device as an aeration device raises the safety and economy of the purification process in the proposed installation. Besides, the circulating pump of the device additionally performs the circulation of sewage and sludge mixture inside the biofilter, which fact favours the stabilisation of the biochemical process within the system "biofilter—combined device" and drives the excessive sludge to the biocoagulator flotator. The HNL application within the above-said system activates the growth of heterotrophic, nitrifying and denitrifying germs and simplifies the technological process control. Meanwhile, the raise of the biochemical process speed correspondingly 1.3–1.5 times reduces the size of the plant. Since the pathogenic contents in 1 $m^3$ of the air used in the biochemical processes of sewage purification reaches 1.5 thous. germs, this air should be directed for disinfection. That is why the application of the water jet aerators in the biocoagulators, fermentor, biofilter, tertiary purification bioreactor provides not only saturation of liquid with oxygen, but also removal of the used air into the bactericide installation.

The fact that the jet aeration joints are designed as a number of diverging beams of supply pipes (aeration columns) whose lower ends are regularly placed above the aeration tank bottom at a distance of 0.1–0.7 m from the latter, provides the shocking impact on of the gas-and liquid flows upon the bottom. The flow movement, vortex formation and air bubble upward flotation provide efficient stirring of the aerotank contents.

The combination of columns in the upper section facilitates the process of their cleaning in case of clogging and simplifies the construction of the works.

As the optimal bottom area falling at one column of 50–70 mm, is making 0.5–1 $m^2$, the surface of the aerotank bottom flat part should be reduced when the sludge mixture circulation ratio is limited. The proposed design of the rollers placed at an angle of 45–60 degrees, permits to solve the above problem and prevent sludge bedding.

The fact that the plastic sheets are to be mounted above the rollers, those sheets having bristles on them, permits to raise the total concentration of the aerotank biomass due to immobilised microflora. The holes in the sheets are supposed to provide the movement of the liquid flows through the sheets thus, correspondingly, raising the efficiency of the contact between the liquid and the attached biocenosis and the sticking together of the microflora The proposed charge for the deep tertiary purification bioreactor also consists of flat sheets having holes and bristles; however the reduction of the hole diameters and intervals between the bristles from the lower to the upper sheet section also favours the catching of the floating matters.

One of the principal factors leading to the reduction of the plant size and the cut of the power loss, is the increase of the biofilter role in the purification effect as a whole.

To enhance the cohesion between the biomass and the surface of the corrugated sheets in the upper section if the latter and, at the same time, to improve the conditions for the waste microflora downward sliding in the lower section, the sheets should have different-sized protrusion and pits. The reduction of the roughness index in the middle and lower sections of the sheets, as well as the availability of smooth vertical stripes, reduce the cohesion power which in its turn promotes fast downward sliding of the biomass and excludes the possibility for the charge sludge to bed. Apart from that, the protruding stripes favour the creation of the laminar mode of the liquid movement across the surface of the sheets.

The recommended roughness factor in the upper section of the sheets is 0.017–0.015, in the middle section it is 0.014–0.012, and in the lower section it equals 0.011–0.01.

The size of the active surface area in 1 $m^3$ of charge depends on the distance between the sheets. On the other hand, this distance reduction raises the probability of sludge bedding due to the increase of silty zones and the weight of the biomass bunch being insufficient for its downward movement. The availability of narrow slots starting in the middle section and finishing in the lower section of the sheets, permit the removal of the formed bunch main mass through them. The biomass squeezing through the slots becomes possible due to the pressure of the biomass deposition and its mineralisation. The bunch is being broken (washed out), besides all, due to the plumb fall of some part of the liquid flowing across the sheet, through the slots.

The wavy partitions between the corrugated charge sheets promote the reduction of silty zones and the creation of a space-hardened construction of the charge.

The efficiency of the biofilter operation, especially at high hydraulic zones, depends on the regularity of irrigation of the charge surface.

The structural concept of the proposed irrigation system is based upon the liquid jet crushing into separate drops as it hits hard surface. The mechanical trajectory of each drop depends on the diameter and length of the drain branch pipes and the distances separating the branch pipes upper cut from the reflector. The recommended branch pipe length is 4–10 pipe diameters since in case of a less length the jet does not move steadily, while in case of a greater length the jet becomes more compact, the mechanical trajectory diversity and that of the fall of the drops reduce.

Further on, the invention is explained by concrete variants of its embodiment, with references to the figures attached, at which.

Figure 1:
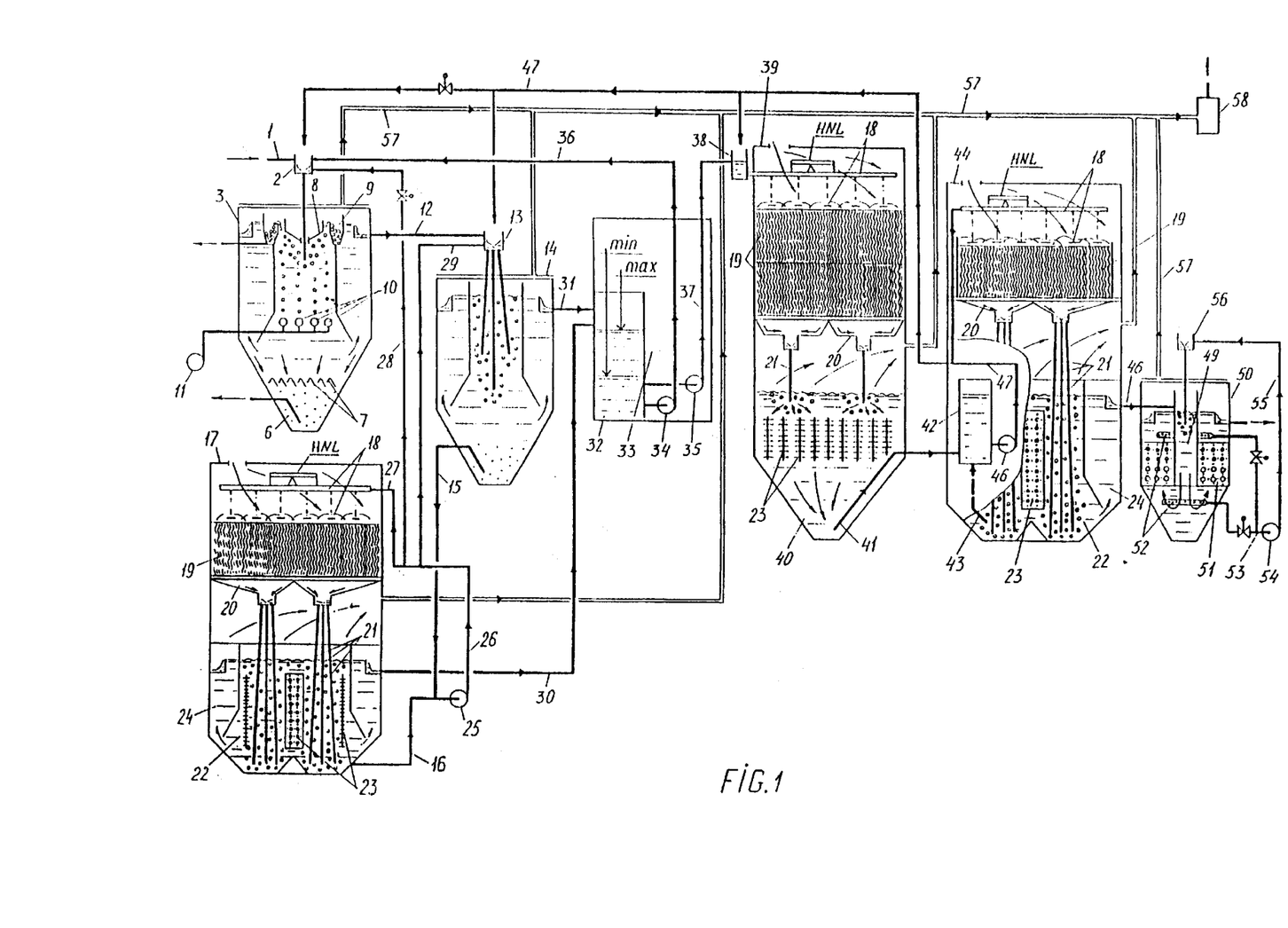
FIG. 1 shows the design of the installation for the biochemical purification of high concentration sewage, in accordance with the invention.

The installation proposed includes the following: initial sewage pipeline 1 joined up to the mixing chamber 2 installed inside biocoagulator-flotator 3 which is divided by a coaxial partition into flotation chamber 4 and settling chamber 5. Chamber 4 is in its turn separated from sediment chamber by a false bottom made from angled elements. The biocoagulator-flotator is provided with adjustable foam reflector 8 fixed at aerator pipe 2, and chute 9 collecting the floating matters with a removing pipeline.

The lower section of the flotation chamber has fine air dispersing aerators 10 consisting of rubber tubes with pricks (up to 100 per 1 cm$^2$) mounted at stainless steel perforated tubes. The aerators are joined up to compressor 11. The chute collecting clarified flows from chamber 5 is joined up, by driving pipeline 12, to the inlet chamber of water jet aerator 13 mounted inside biocoagulator 14 which is divided by a coaxial partition into a flocculation chamber and a settling chamber. Sediment removing pipeline 15 is joined up to sucking pipeline 16 of pump 25 of fermentor 17, the latter comprising irrigating system 18 with HNL mounted at the distributing chute; biofilter 19 with collecting tray 20 and aeration columns 21 attached to the latter; aeration tank 22 provided with artificial charge 23 of plastic sheets having holes and bristles; settler 24 and circulating pump 25 pressure pipeline 26 is joined up, through pipeline 27, to irrigating system 18 of fermentor 17, through pipeline 28 to inlet chamber 2 of biocoagulator-flotator 3, and through pipeline 29 with inlet chamber 13 of biocoagulator 14.

The collecting chutes of the settlers of fermentor 17 and biocoagulator 14 are connected by driving pipelines 30 and 31 to inlet reservoir 32 of pump plant 33 with pumps 34 and 35 installed in it. Meanwhile, pressure pipeline 36 of pump 34 is connected to inlet chamber 2 of biocoagulator-flotator 3, and pressure pipeline 37 of pump 35 is connected to intermediate vessel 38, the latter being joined up to the irrigating system of separate biofilter 39. The biofilter consists of HNL mounted at the distributing chute, charge 19, collecting trays 20 with aeration columns 21 and reaction vessel 40 with artificial charge 23.

Pipeline 41 removing sewage and sludge mixture from biofilter 39 is connected to mixing chamber 42, where also attached is gravity-flow pipeline 43 of combined device 44, the latter consisting of irrigating system 18, HNL, biofilter 19, aeration columns 21, aerotank 22 with artificial charge 23, and settler 24.

Combined device 44 is joined up, by pipeline 46, to aeration chamber 49 of tertiary water purifying bioreactor 50 with artificial charge 51 and collecting perforated pipes 52 installed in it. The pipes are connected, through driving pipelines having solenoid valves, to sucking pipeline 53 of circulating pump 54 whose pressure pipe 55 is connected to water jet aerator inlet chamber 56. Bioreactor 50 has a collecting chute with a removing pipeline.

All the spaces above the aerated elements of the biocoagulators, fermentor, biofilter, combined device, tertiary purification bioreactor are covered with hermetic shields. To remove the air, they have air ducts 57 which, in their turn, are connected to bactericide installation 58.

Fermentor bottoms 17 and combined device bottoms 44 (FIG. 2) are made flat with rollers 59 and angles of 45–60 degrees. The flat areas of the bottom are conventionally divided into squares having the lower ends of aeration columns 21 mounted in 0.1—0.7 m above their centres.

Pipeline 60 removing the circulating sludge mixture (FIG. 3) is mounted along the aeration tank perimeter and provided with sucking branch pipes 61 which provide even removal.

There are plastic sheets with bristles and wholes 23 (FIGS. 4, 5) installed above the rollers.

Figure 6:
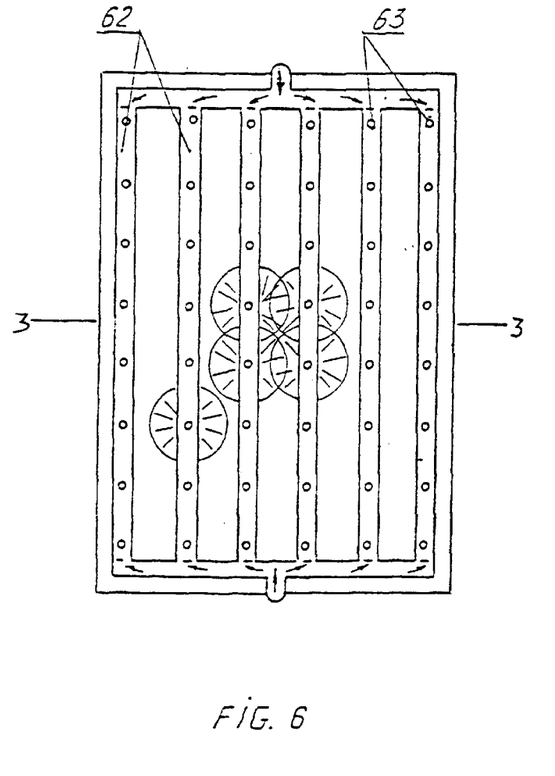
FIG. 6 shows the layout of the distributing chutes of the biofilter irrigating system.

Irrigating system 18 construction (FIG. 6) includes distributing chutes 62 with drain branch pipes 63 whose distance above the tray bottom is adjusted by way of screwing. Pipe branch 63 has reflectors 64 under it mounted at frame 65.

Figure 9:
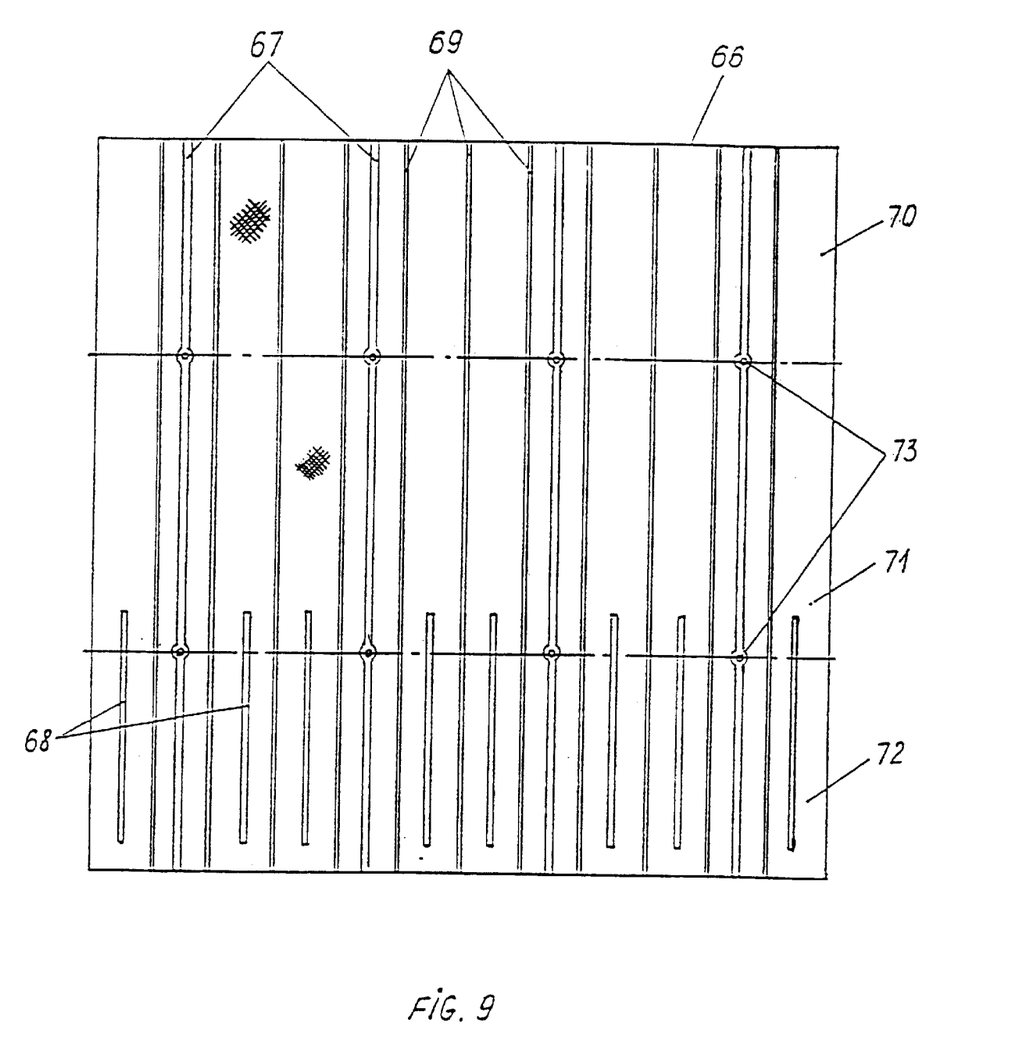
FIG. 9 shows a biofilter charge sheet, front view.

The sheets have protrusions and pits whose size in horizontal stripe 70 is maximum (n=0.017–0.015), in medium stripe it is n=0.014–0.012, and it is minimum (n=0.011–0.010) in lower stripe 72 of the sheets.

Figure 10:
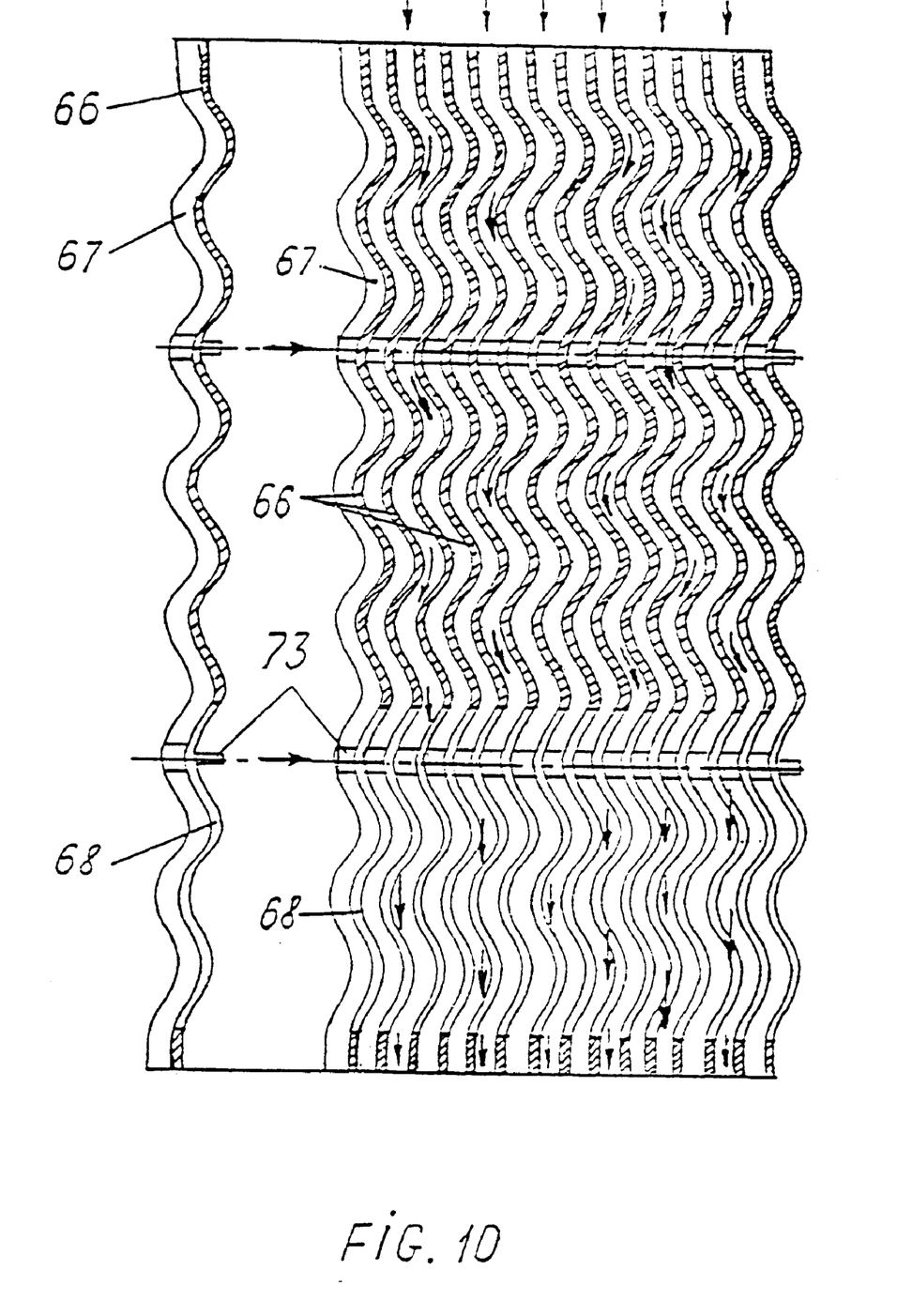
FIG. 10 shows a section of a biofilter charge block.

The charge sheets are interconnected by self-latching locks 73.

The charge of tertiary purification bioreactor 51 (FIGS. 11, 12) is made of plastic sheets having bristles and holes with distances and diameters reducing upward from 7 mm to 2 mm and from 12 mm to 2 mm correspondingly.

The installation is operated as follows.

The sewage after preliminary mechanical treatment, is driven through pipeline 1 to the inlet chamber of water jet aerator 2 of biocoagulator-flotator 3. Here also, by circulating pump 46 through pressure pipeline 47, is driven excess sludge from the system 'biofilter 39—combined device 44' and, through pressure pipeline 28, is driven excess biomass from fermentor 17.

As the initial sewage stops to be driven to chamber 2 through pipeline 36, the clarified flows begin to be driven from inlet reservoir 32 of pump plant 33.

Pump 34 is switched on automatically. It permits to remove organic impurities from the biocoagulator-flotator and for their further treatment.

After getting inside the inlet chamber of the aerator, the sewage is mixed with sludge and then drained to the aeration column together with the air being driven with it. The air mass getting inside flotation chamber 4 and the air driven through fine dispersion aerators 10 from compressor 11 provide the stirring of the liquid, part of the sludge and impurities. Meanwhile, due to the processes of sorption, flocculation and coagulation, formed are significant accumulations precipitating as flocculent.

The air bubbles floating upwards raise to the surface light flakes with impurity particles, fats and surface active matters. With the help of reflector 8 mounted in the central part of biocoagulator-flotator, the foam is repelled aside towards collecting chute 9, and jiggled across the ridge. The foam is extinguished in the chute, and the liquid is removed through the driving pipeline.

At the initial purification stage, the bulk of dispersion impurities and a part of suspended, dissolved and colloidal impurities are precipitated under the impact of gravity action and biocoagulation. The sediment drops through angles 7 into sediment chamber 6 and is periodically removed. The angles prevent the sediment from floating into the flotation zone.

The use of the excess sludge from the system 'biofilter 39—combined device 44' and fermentor 17 may provide the effect of the suspended impurities reduction to 40–60%, BOD to 20–30%.

The sewage is driven from flotation chamber 4 to settling chamber 5 of biocoagulator-flotator 3 where, as the liquid is passing through the layer of suspended sediment, small disperse suspended particles are caught. The clarified water is poured to the collecting chute and driven, through pipeline 12, to water jet aerator collecting chamber 13 of bicoagulator 14.

During start-up works, at peak loads and emergency, for quick increase of the active biomass inside the system 'biocoagulator 14—fermentor 17', the sludge from the system 'biofilter 39—combined device 44' is driven to inlet chamber 13. The above feed is taking place through the pipe connected to pressure pipeline 47. The feed may also be performed during the installation operation. The cultivated biomass (sludge) from fermentor 17 is driven to the inlet chamber through pipelines 26 and 29 as well.

The bulk of the dissolved and colloidal matters is removed by the active sludge in biocoagulator 14. The sediment and the substrate are driven, through pipeline 15, to sucking pipeline 16 of circulating pump 25, where these are mixed with the circulating biomass. After that, the bulk mixture, through pressure pipelines 26 and 27, is driven to irrigating system 18 of fermentor 17; a part of sludge is fed to inlet chamber 13 of biocoagulator 14 through pipeline 29, and the excess biomass removed from fermentor 17 is driven to inlet chamber 2 of biocoagulator-flotator 3 through pipeline 28.

The oxidation of the bulk organic impurities at the second purification stage is carried out inside the biofilter and aerotank settler of fermentor 17 by way of the repeated circulation of sewage and sludge mixture inside irrigating system 18, biofilter 19, collecting trays 20, aeration columns 21, aeration tank 22.

Irrigating system 18 of biofilter 19 is operated the following way.

Figure 7:
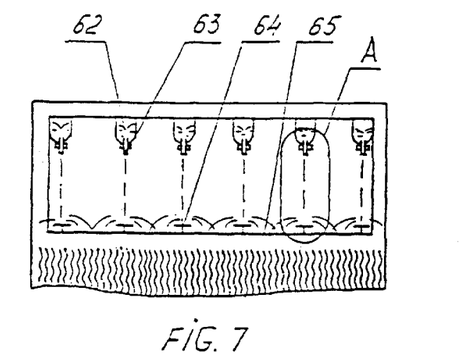
FIG. 7 shows section 3—3 (see FIG. 6)
Figure 8:
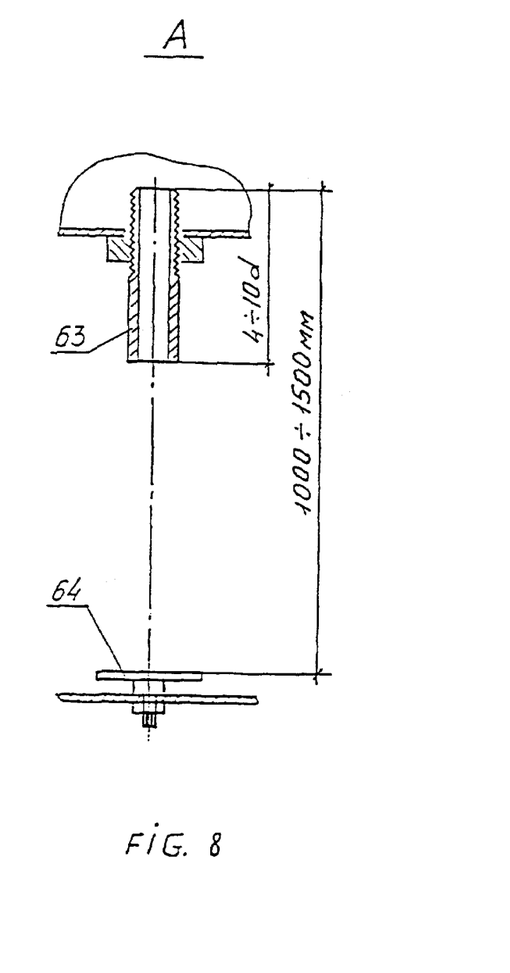
FIG. 8 shows unit A (see FIG. 7)

The arriving sewage and sludge mixture (FIGS. 6, 7, 8) is distributed with the help of the adjusting devices through trays 62, where from, through discharge pipe branches 63, it falls upon reflectors 64. As the liquid is driven through discharge pipe branches 63, there are formed vortexes, and air bubbles are dispersed into the liquid. As a result, the liquid is saturated with air oxygen. The liquid jet falling upon the reflector, shock on the surface and a broken into separate drops which obtain various mechanical trajectories.

The drops fall upon the charge of biofilter 19.

Sliding down corrugated sheets 66, the sewage and sludge contact with the immobilised biomass.

What occurs is the sorption of the organic impurities contained in the liquid and their biological oxidation with germs. As a result of the increase of germs and the anaerobic processes, pieces of the waste biomass are torn off the lower layer of the biocenosis. As the biomass slides down, there may occur silting zones between sheets 66 in their middle and lower sections.

An obstacle hampering formation of large silting zones are corrugated partitions 67 which also serve keep sheets 66 at a fixed interval from each other, and vertical smooth stripes 69.

As a result of the fact that the centre of gravity of the biomass sliding down the sheets, is mainly in the middle and between the partitions, the availability of slots 68 permits the general amount of the formed biomass bunch to be driven through them. The formation of stable biocenosis with versatile microflora under high hydraulic loads of 70–150 $m^3/(m^2 \cdot day)$ is favoured by the developed roughness in the upper section of the sheets. Meanwhile the roughness reduction in the middle and lower sections, and the availability of smooth stripes permit to improve the conditions for biomass sliding down due to the sticking power reduction. The liquid that has passed the biofilter, is driven by the collecting tray to the inlet chamber to which aeration columns 21 are attached. The jet aeration units are made as bunches of pipes directed under different angles, these pipes sunken into the aeration tank liquid.

Figure 2:
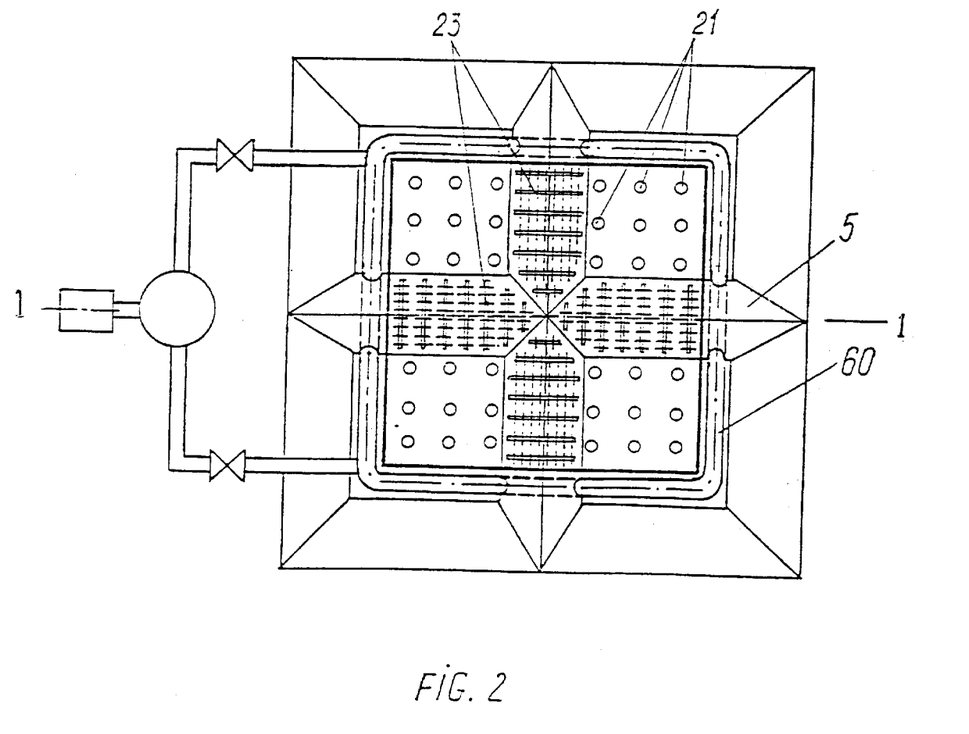
FIG. 2 shows the layout of the aeration tank bottom with the scheme of aeration columns, bottom rollers and aerotank charge disposition.
Figure 3:
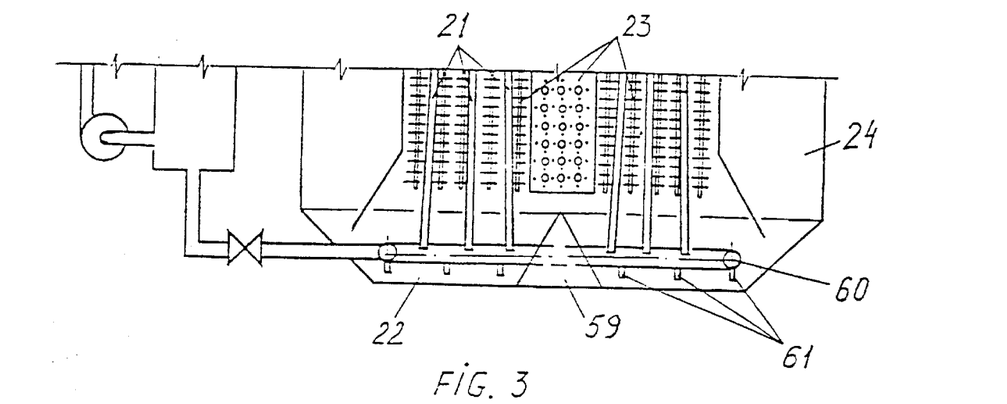
FIG. 3 shows section 1—1 see (FIG. 2)

The proposed design of aeration columns 21 placement and the construction of the bottom with rollers 59 provide efficient stirring of the sludge mixture in the aeration zone and exclude the formation of sludge bedding zones. The availability of sucking branch pipes 61 of pipeline 60 provides even and regular removal of the sludge mixture along the whole bottom perimeter.

Figure 4:
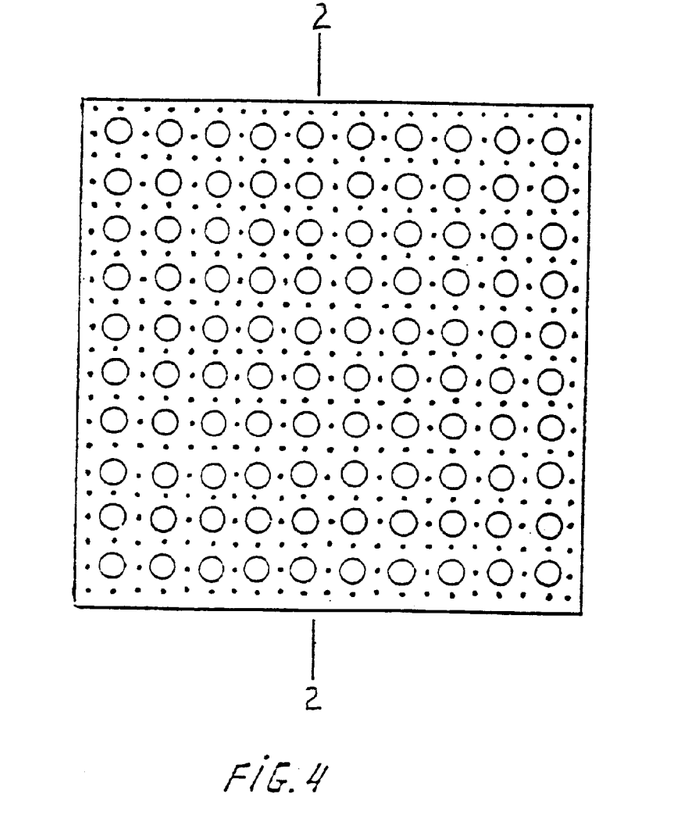
FIG. 4 shows a part of an aeration tank sheet charge, front view.
Figure 5:
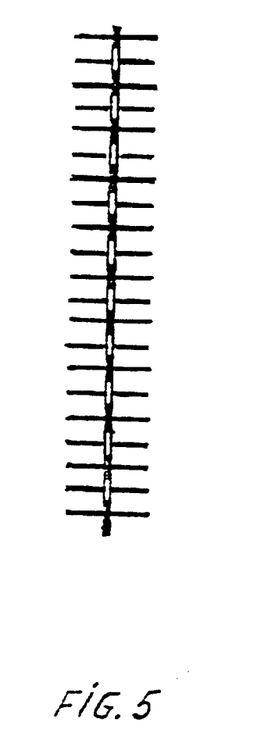
FIG. 5 shows section 2—2 (see FIG. 4)

The formation of biocenosis at the bristles of aerotank charge 23 enhances the concentration of the active biomass inside the reaction aerotank volume. The availability of the holes favours the flows stirring. To quicken germ reproduction and the purification process control during the flow and sewage contents fluctuations, liquid temperature and pH alterations, toxic components penetration, one or several distribution chutes of the fermentor irrigating system should have He—Ne lasers installed.

Laser treatment of the circulating mixture of sewage and sludge is carried out in a scanning mode across the whole width of the chute. In case the laser installation has an output radiation capacity of 25 mwt and a wave length of 0.63 mkm at a height not less than 300 mm above the liquid surface, scanned is a zone whose length is not less than 100 mm.

Laser radiation stimulates structural and functional reconstruction of membrane formations of the cells and cell organelles.

The mechanism of extracting the substrate and cultivating the active biomass at the second purification stage is as follows. The disperse flakes of sludge flocculate in the biocoagulator as suspended, dissolved and colloidal matters. While the flakes precipitate, there starts the process of fermenting matters with germs. Sufficient feeding, rich supply with oxygen and fermentor orientation upon incomplete purification provide permanent speed of the bacteria growth.

The system 'biocoagulator - fermentor' shows efficient performance in case of comparatively high loads upon sludge, within the limits of 0.6–0.8 kg $BOD_{20}$ per 1 kg of dry sludge per day, while the cell synthesis provides sludge extraction of about 0.6. kg of dry substance per 1 kg of the removed $BOD_{20}$.

The optimum effect of the impurities reduction at this stage is making 50–60% $BOD_{20}$, 20–40% in suspended matters.

To raise the concentration of the active sludge in the fermentor, the settled water is to be drained through pipeline 30 to inlet reservoir 32 of pump plant 33. Here also, through pipeline 31, is driven settled water of biocoagulator 14. Further on, the sewage is driven by pump 35 through pressure pipeline 37 to intermediate vessel 38 of biofilter 39. Pump 35 is switched on automatically as the water level in the reservoir reaches the 'max' mark; the pump is switched off as the water level drops to the 'min' mark.

Intermediate vessel 38 also receives the sludge mixture from mixing chamber 42 combined device 44. The mixture is driven by pump 46 through a discharge tube attached to pipeline 47. The sludge mixture is pumped to irrigating system 18 of the combined device through the same pipeline.

Inside the irrigating systems, the liquid is distributed to the chutes and falls, through the discharge tube branches, first on the reflectors and then on the biofilter charge. Charges 19 of biofilter 39 and combined device 44 are designed for the oxidation of the bulk of the impurities arriving. Oxidation of the rest part and further nitrification of nitrogen containing compounds is performed by the active sludge located in reaction zone 40 of biofilter 39 and the settler aerotank of combined device 44. The sludge is supplied with oxygen due to the air oxygen dissolution in the sludge mixture as the latter passes through the charge materials, as well as due to air involvement (0.6–0.9m$^3$ per 1 m$^3$ of the circulating liquid) occurring inside aeration columns 21, and further dissolution.

The bulk of the sludge mixture arriving through pipelines 41, 43 to mixing chamber 42, is driven to irrigating systems 39 and 44, some part of the mixture (excess sludge) is automatically (by the signal on the sewage feed to the installation) driven to inlet chamber 3, while the expelled sludge mixture gets to the settler of device 44 where the sludge is clustered into flakes and precipitated, and the clarified water arriving to the collecting chute is driven, through pipeline 46, for further treatment.

After the first and second purification stages are over, a significant part of the sewage are the oxidation resistant organic matters. For this reason, as well as with the aim of the nitrogen compounds oxidation, the third purification stage occurring in biofilter 39 and combined device 44, is performed in the mode of complete oxidation with low loads upon the circulating sludge (0.05–0.01 kg BOD$_{20}$ per 1 kg of dry matter per day).

The radiation of the sludge mixture with He—Ne lasers raises the speed of heterotrophic assimilation, ammonification and nitrification 1.5 times on the average.

The biofilter and the combined device are designed to oxidise 10–20% of the organic impurities and reduce the BOD to 15 mg/l, and the suspended matters to 10 mg/l.

The reduction of the organic impurities contents in the purified water with BOD$_{20}$ reaching 5–10 mg/l and the suspended matters reaching 0 . . . 3 mg/l, is further carried out in bioreactor 50.

Figure 11:
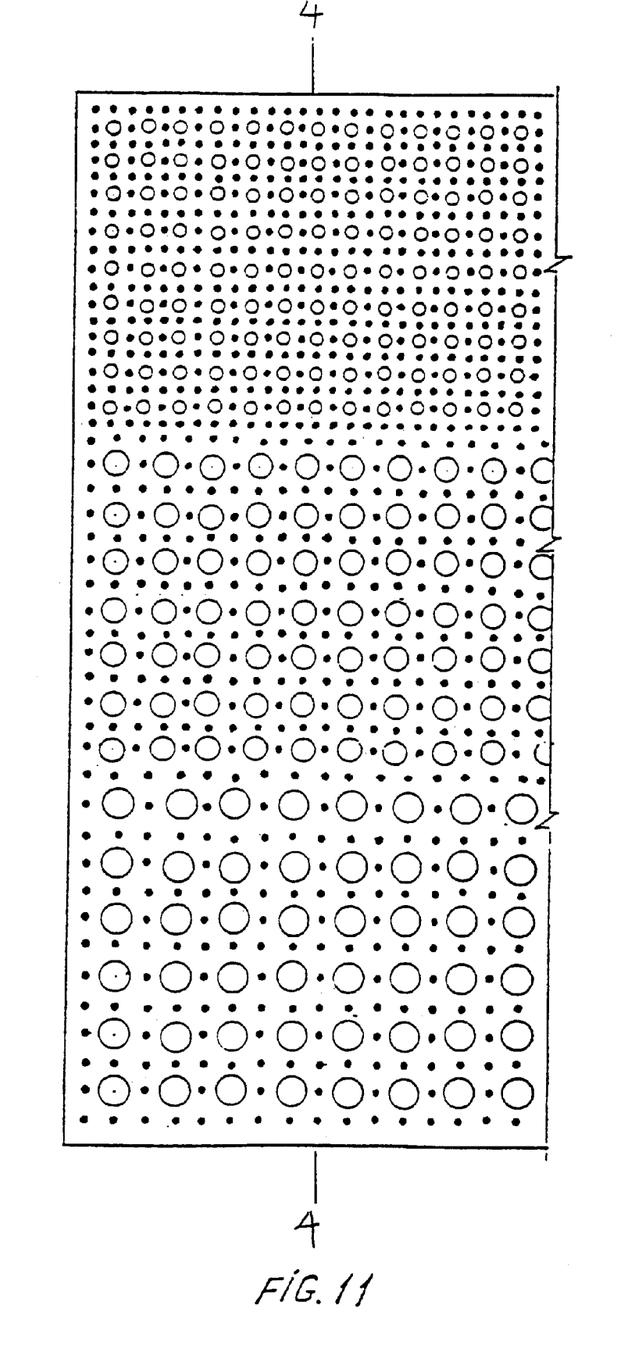
FIG. 11 shows a charge sheet of the deep tertiary purification bioreactor, front view.
Figure 12:
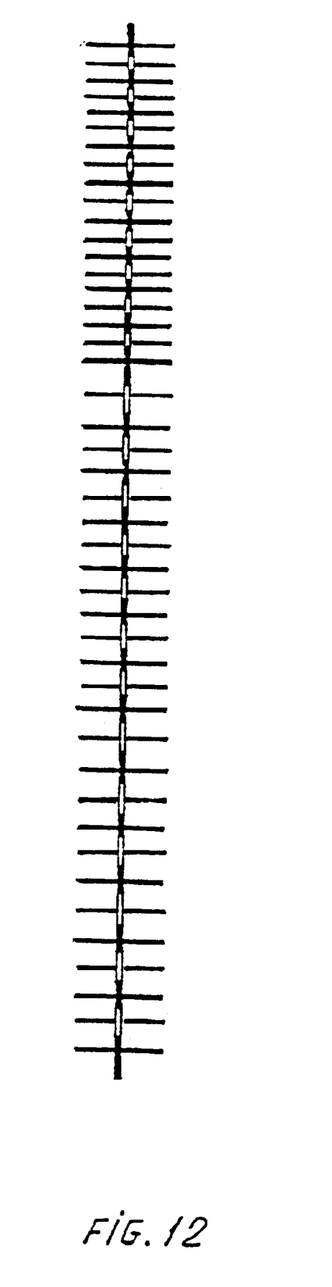
FIG. 12 shows section 4—4 (see FIG. 11).

Tertiary purification is performed by way of two and three-fold water circulation through the layer of microflora immobilised at the charge bristles. The reduction of intervals between the bristles towards the sheets upper sections provides complete catching of the floating matters. The intake of the water from the vessel is carried out through perforated pipes 52, while the water is driven to aeration chamber 49 by pump 54 through pipeline 55 and through water jet aerator 56.

As the water arrives to 49, the solenoid valve located at the discharge pipeline from the upper perforated pipe is automatically locked, while the solenoid valve located at the discharge pipeline from the lower perforated pipe is automatically opened. As the water stops to be discharged, the valves are closed and opened in the reverse order. To prevent the contamination of the people, all the spaces above the aerated elements of the installation are hermetically closed, and the expelled air is driven, through air ducts 57, to the installation with germicidal lamp where it is antiseptisised.

INDUSTRIAL APPLICABILITY

Based on the above invention, one may manufacture installations for complete biological purification of the sewage produced by the enterprises referred to chemical, pharmaceutical and microbiological industries, sugar-houses, yeast factories, meat-preserving and fish factories, the BOD concentration of this sewage impurities from 1000 to 10000 mg/l. In case the sewage impurities concentration BOD ranges from 1000 to 2500 mg/l, the biocoagulator and the fermentor of the second purification stage may be excluded from the design.

LIST OF REFERENCE NUMBERS USED IN THE DESCRIPTION

1—primary sewage pipeline
2, 13, 56—water jet aerators with inlet chambers
3—biocoagulator-flotator
4—flotation chamber
5—settling chamber
6—sediment chamber
7—angles
8—air reflector
9—floating matters collecting chute
10—fine air dispersion aerators
11—compressor
12, 30, 31—clarified sewage discharging pipelines
14—biocoagulator
15—sediment discharging pipeline
16, 53—sucking pipelines
17—fermentor
18—irrigating system
19—charge (biofilter)
20—collecting trays
21—aeration columns
22—aeration tank
23, 51—artificial charge
25, 46, 54—circulating pumps
26, 27, 28, 29, 36, 37, 47, 55—pressure pipelines
32—inlet reservoir
33—pump plant
34, 35—pumps driving clarified sewage
38—intermediate vessel
39—attached biofilter
40 reaction vessel
41, 43—sludge mixture removing pipeline
42—mixing chamber
44—combined device
48—clarified water removing pipeline
50—deep tertiary sewage purification bioreactor
52—perforated pipes
57—air ducts
58—air disinfection installation
59—rollers
60—sludge mixture intake pipeline
61—pipe branches
62—distributing chutes
63—discharging pipe branches
64—water reflectors
65—framework
66—corrugated sheet
67—corrugated partition
68—slot
69—smooth stripe
70, 71, 72—horizontal stripes of various roughness degree
73—locks

What is claimed is:

1. An installation for biochemical treatment of concentrated sewage comprising a primary purification stage biocoagulator, a biofilter, a combined device which includes a biofilter with an irrigating system located above a settler aeration tank, the latter having water-jet aeration columns and pipelines removing a sludge mixture, a mixing chamber and a circulating pump, a tertiary sewage purification bioreactor with an artificial charge, and a pipeline system, characterized in that the primary purification stage biocoagulator comprises a flotation chamber, a water-jet aerator, fine air dispersion aerators, a foam reflector, foam collecting chutes and pipelines removing foam and clarified sewage; additionally included are: a pump plant with a discharge tank and two pumps driving clarified sewage; the biofilter is equipped with an intermediate vessel, a He—Ne laser (HNL) irrigating system, a charge, collecting trays, aeration columns, a reaction vessel with an artificial charge and a pipeline removing sludge water to the mixing chamber of the combined device also equipped with HNL; the tertiary sewage purification bioreactor is equipped with a water-jet aerator, an aeration chamber, a chamber with an artificial charge, perforated pipes combined by discharge pipes with the circulating pump whose pressure pipeline is connected to the suction chamber of the water-jet aerator; the primary sewage pipeline is connected to the suction chamber of the water-jet aerator of the primary purification stage biocoagulator whose pipeline discharging clarified water is connected to the suction chamber of the discharge tank of the pump plant; a pressure pipeline of the combined device circulating pump is connected to the biofilter intermediate vessel, to the suction chamber of the primary purification stage water-jet aerator and to the irrigating system of the combined device biofilter, while the pipeline removing clarified water from the combined device is connected to the tertiary sewage purification bioreactor; a pressure pipeline of a first pump of said mixing chamber for driving clarified sewage is connected to the suction chamber of the primary purification stage water-jet aerator while a pressure pipeline of a second pump of said mixing chamber for driving clarified sewage is connected to the biofilter intermediate vessel.

2. The installation of claim 1, characterized in that, in order to treat high-concentrated sewage, it comprises a secondary purification stage biocoagulator having a water-jet aerator, said biocoagulator being, connected with its inlet to the pipeline removing clarified sewage from the primary purification stage biocoagulator and with its outlet to the discharge tank of the pump plant; and a fermenter equipped with an irrigating system, a biofilter, aeration columns, a settler aeration tank with an artificial charge, a circulating pump and a pipeline removing clarified sewage; a pipeline removing sediment from the secondary purification stage is connected to a sucking pipeline of the fermenter pump, while the pressure pipeline of the above pump is connected to the fermenter irrigating system and suction chambers of the primary and secondary purification stages, the pipeline removing clarified sewage from the fermenter is connected to the discharge tank of the pump plant, the pressure pipeline of the combined device circulating pump is connected to the suction chamber of the water-jet aerator of the secondary purification stage biocoagulator.

3. The installation of claim 1 wherein the spaces above the aerated elements are sealed and connected to air ducts which are in their turn connected to a germicidal installation.

4. The installation of claim 2 wherein aeration columns of the fermentor and combined device designed as diverging beams of the pipes whose lower ends are evenly placed over a flat section of the tank bottom in a 0.1–0.7 m distance above it; a sludge mixture removing pipeline with sucking branches is located along the bottom perimeter; the bottom has rollers on it placed at an angle of 45–60 degrees and, above them, there are plastic sheets with bristles and holes.

5. The installation of claim 1 wherein the charge of the tertiary sewage treatment bioreactor comprises plastic sheets having bristles and holes, yet with distances between the bristles and diameters of those holes reducing upward.

6. The installation of claim 1 wherein the elements of the biofilter charge designed as corrugated sheets with horizontal stripes of the roughness factor $n=0.017-0.015$ in their upper section, $n=0.014-0.012$ in the middle section, $n=0.011-0.010$ in the lower section, and vertical elements: protruding smooth stripes and slots running from the middle to the lower section of the sheets.

7. The installation of claim 1 wherein each of the irrigation systems manufactured from distributing chutes with adjusting gears and drain branch pipes, their length being equal to 4–10 diameters, located at a 1–1,5 m distance from the upper cuts of the branch pipes to the reflectors, these branch pipes being mounted so that the distance between them and the chute bottom may be altered.

* * * * *